May 12, 1959

E. ORSHANSKY, JR 2,886,142

VIBRATION DAMPING APPARATUS

Filed Feb. 27, 1957

Inventor
Elias Orshansky, Jr.
Rodney Bedell
atty.

United States Patent Office 2,886,142
Patented May 12, 1959

2,886,142

VIBRATION DAMPING APPARATUS

Elias Orshansky, Jr., Newport Beach, Calif., assignor to Chicago Railway Equipment Company, Chicago, Ill., a corporation of Illinois Application February 27, 1957, Serial No. 642,835

21 Claims. (Cl. 188—96)

This invention relates to vibration damping apparatus applicable to resiliently supported, vibrating loads such as are encountered, for example, in railway, automotive, aviation and analogous practice. The apparatus is also applicable to power shears, drop hammers and similar apparatus in which vibration damping is desirable.

Among the several objects of the invention may be noted the provision of vibration damping apparatus conveniently applicable particularly (but without restriction) to heavily loaded resiliently organized mechanical systems involving comparatively small normal deflections; the provision of apparatus of the class described which is self-adjusting to operate with predetermined desired modes of response regardless of variations in static load and initial deflection; the provision of apparatus of the class described which may be designed conveniently to provide any of various modes of damping according to practical requirements; the provision of apparatus of the class described incorporating control over the frequency at which damping action will start; and the provision of apparatus of this class which is economical to construct, simple and compact in form and reliable. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is an axial section of apparatus embodying one form of the invention;

Corresponding reference characters indicate corresponding parts throughout the several views of the drawings.

Figure 1:
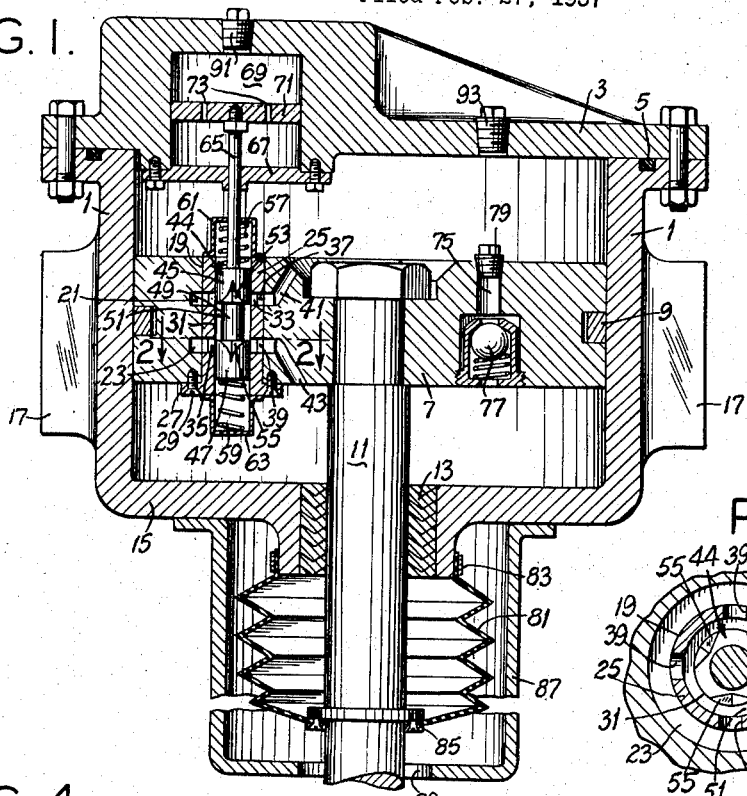

As is known, in railway, automotive, aviation and similar vehicular practice, applied loads are resiliently supported by springs, resilient cushion means and the like which have initial deflections depending upon the static load and which are subjected to varying additional deflections induced by vibration, the frequencies and amplitudes of which depend upon the dynamics of the system. Vibration damping apparatus of the class described herein, regardless of any initial deflection, consistently damps out said vibrations, whether forced or natural. The result in the case of vehicles is a smoother and steadier ride, and in any case considerable reduction in vibration-induced accelerations and forces. While a vehicular application is described, the invention has other applications, as stated, to mechanical systems such as power shears, drop hammers and the like, in which damping of vibrations is important from the viewpoint of preventing shock to frames, foundations and surroundings.

Referring now more particularly to the drawings, there is shown at numeral 1 a fluid container in the form of a cylinder to which is bolted an enclosing (top) head 3, suitable sealing packing 5 being employed between them. Within the cylinder 1 is a movable divider in the form of a main plunger or piston 7, carrying peripheral ring-sealing means 9. This piston is affixed to a piston rod 11 passing through packing 13 in another (bottom) head 15 of the cylinder. The top and bottom relation between heads is incidental and used only for convenience in description, for the device may also be horizontally mounted, inverted or set at an angle.

The piston rod extends to a point of attachment (not shown) to an ultimate load-bearing member, such as, for example, a side frame, spring plank or the like of a railway truck. The cylinder is provided with attachment means such as one or more pads 17, by means of which the cylinder may be appropriately bolted, for example, to a sprung member such as a railway truck bolster. In this example, the bolster is supported by the usual car springs, which are supported by the side frames. The stated points of attachment may be reversed. The side frame and bolster above-mentioned constitute only one example of relatively movable, spring-connected parts, to which the cylinder 1 and shaft 11 are appropriately attached. In the railway example, the static load is large and widely variable as to that part which constitutes the pay load of the car. In this example, also, the springs have a very high spring rate, i.e., small deflection per unit of load. These conditions also prevail in some other vehicular applications, such as trucks, buses and heavy planes.

Figure 2:
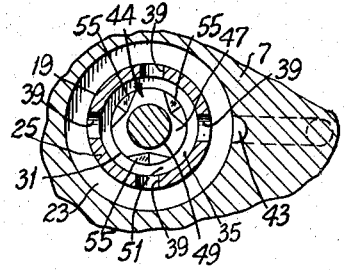
Fig. 2 is an enlarged cross section taken on line 2—2 of Fig. 1.

Passing through piston 7 is a cylindric bore 19, surrounded by spaced grooves 21 and 23. Inserted into the bore 19 and fastened therein is a closely fitting liner sleeve 25. The fastening means may be constituted by a flange 27 and screws 29. The sleeve 25 has an internal cylindric bore 31 having spaced peripheral grooves 33 and 35. Suitable ports 37 in the sleeve 25 join the grooves 21 and 33. Similar ports 39 join the grooves 23 and 35 (Fig. 2). The grooves 21 and 23 in the piston 7 are respectively connected to opposite sides of the piston by means of angled passages 41 and 43.

Within the inner bore 31 is located a spool-shaped balanced slide valve 44, constituted by heads 45 and 47 joined by a smaller stem 49. The inner portions of the heads 45 and 47 adjacent the ends of the space 51 are provided with one or more passages or tapering slots 53 and 55, three being shown (Fig. 2). Those passages 53 in one head 45 have progressively decreasing triangular cross sections in a direction opposite with respect to like passages 55 in the other head 47. The length of the space 51 around the stem 49 approximates the distance between the adjacent sides of the grooves 33 and 35, being preferably slightly greater. Thus when the valve is centered, as shown in Fig. 1, there is a relatively open and hydraulically free inter-connection effected between one side and the other of piston 7 (through passages 41, 21, 37, 33, 53, 51, 55, 35, 39, 23 and 43). This is because the slots 53 and 55 present maximum openings to their surrounding grooves or ports 33 and 35, respectively.

Valve 44 is normally centered for maximum liquid flow by means of springs 57 and 59, respectively, reacting against cups 61 and 63 attached to the opposite ends of the sleeve 25. One of the valve heads 45 is provided with a valve stem 65 which passes through a head 67 into an auxiliary fluid container or cylinder 69 forming a dashpot. Within the dashpot 69 the stem 65 carries an auxiliary divider or plunger in the form of a piston 71, having throttling ports 73 connecting its opposite sides.

At numeral 75 is shown a stepped passage connecting opposite sides of the piston 7, in which is located a one-way check valve 77. The operation of this check valve is optional. To this end, passage 75 is provided with a screw plug 79 which is removed when the check valve 77 is to become optionally operative. Otherwise the plug 79 is left in place. Obviously the valve action can be omitted by omitting the passage 75 and the valve itself.

A protective flexible bellows 81 (for example, composed of rubber or like flexible material) has one end attached and sealed to the part of the head 15 around packing 13, as shown at 83, and the other end attached and sealed to the piston rod 11, as shown at 85. This is to prevent entry of dirt into the system. A metallic guard sleeve 87 attached to the head 15 prevents damage to the flexible bellows 81 by flying debris. An opening 89 in the guard sleeve 87 forms a passage for the movable rod 11.

The device is filled with hydraulic fluid, such as oil, brake fluid, so-called type A transmission fluid or the like, having lubricating properties and a desired viscosity which is fairly constant with temperature change. Filling may be accomplished through openings having removable screw plugs 91 and 93. Operation of the form of the device shown in Fig. 1 is as follows, assuming the plug 79 to be in place (i.e., valve 77 inoperative), the shaft 11 connected at its lower end to a reaction point such as a truck side frame, and the cylinder 1 attached to a movable spring-mounted load-bearing member such as a truck bolster.

The parts are so dimensionend and connected that with an arbitrary load value applied to the load-bearing member, they have what will be called a neutral position such as shown in Fig. 1. Upon lightening the load, the cylinder will move up with respect to the relatively stationary piston 7 and with increase in the load it will move down. Or stated conversely (relative to the cylinder 1), the piston 7 moves up in the cylinder with increased loading and moves down in the cylinder with decreased loading. The ports 73 in the piston 71 in the dashpot 69 are so sized in view of the viscosity of the hydraulic fluid selected, that there is relatively low friction against slow cross flow. When the static load is changed, as by gradually loading and unloading the load-supporting member, the relative movements between the cylinder 1 and piston 7 are slow. The dashpot piston 71 readily follows the movements of the piston 7 under the balanced holding action of the springs 57 and 59 on valve 44. Therefore, under these conditions there is a relatively free cross flow of hydraulic fluid from one side to the other of the main piston 7, the valve 44 being centered. This free flow is through passages 41, 21, 37, 33, 53, 51, 55, 35, 39, 23 and 43. As a result, no substantial damping action develops nor is required.

When, for example, the vehicle moves, vibrations set in which, if excessive, it is desired shall be damped, particularly under conditions of resonance. Relatively high frequencies, particularly at large amplitudes, result in increased relative velocity between the piston 7 and cylinder 1. As the velocity increases, it becomes increasingly difficult for the piston 71 closely to follow the movements of piston 7, inasmuch as resistance to flow of fluid through the ports 73, or choking, increases with the velocity of flow. Consequently, the movement of piston 71 lags with respect to the movement of piston 7 on both the up and down strokes of the latter.

Assuming an up stroke of piston 7 relative to cylinder 1 (load descending), it will be seen that any lagging action of valve 44 causes slots 53 increasingly to be covered, so as increasingly to throttle the flow from the top side to the bottom side of the piston 7. Conversely, assuming a down stroke of piston 7 relative to cylinder 1 (load rising), it will be seen that lagging action of valve 44 causes slots 55 increasingly to be covered, so as to throttle the flow from the bottom side to the top side of the piston 7. Thus the relative motions of piston 7 and cylinder 1 are restricted and the device serves to damp oscillations in accordance with their frequencies and amplitudes. The result is that the system will oscillate only at low frequencies and amplitudes, which is what is desired.

Another way in which the operation may be viewed is to suppose that there is a slow relative motion up and down of the rod 11 and piston 7 with respect to the cylinder 1. The orifices 73 in the dashpot piston 71 then in effect permit the valve 44 to follow the motion of the piston 7. This is necessary so that the relative positions of the valve 44 and of the piston 7 shall not be disturbed, irrespective of, say, the loading of a car.

On the other hand, suppose that there is a rapid oscillation of rod 11 and piston 7 produced by road shocks. Then the valve 44 will be unable to follow these oscillations, due to the throttling or choking action which comes into play at the required high liquid velocities through the orifices 73 in the dashpot piston 71. Hence there will be alternating relative displacements or lags of the piston 7 with respect to the valve 44, and the flow of oil from one side to the other of piston 7 will become progressively constrained as the wedge-shaped slots 53 and 55 in the valve 44 increasingly lag. This means that the more rapid the frequency and greater the amplitude of the relative vibrating motion of the rod 11 to cylinder 1, the greater is the desirable damping or snubing action produced.

Figure 3:
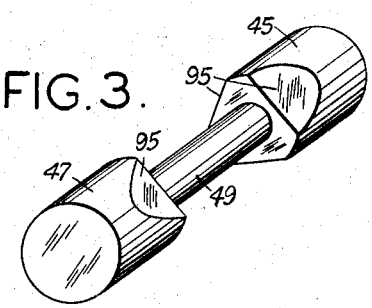
Fig. 3 is an isometric view of an alternative form of control valve.

The slots 53 and 55 may be shaped to effect any desired progressive rate of damping or snubbing action desired. In the form of Figs. 1 and 2, each is triangular in cross section and axially tapering and cusped. As an example of an appropriate change in the porting of the valve 44 for certain purposes, see Fig. 3, wherein the ports are made by machining appropriate flats 95 on the margins of the valve heads 45 and 47. From the above it will be seen that the particular shapes of the slots 53 and 55 are controlling of the functional relationship between damping and vibration, and that it is possible to build into the device by reshaping of the slots 53 and 55 any snubbing action that a particular application of the device may require.

Figure 4:
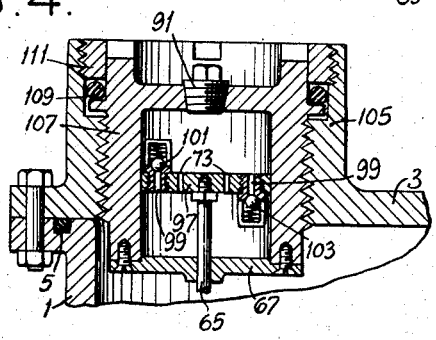
Figs. 4 and 5 are views similar to the upper left-hand portion of Fig. 1 but respectively showing modifications.

Additionally, the orifices in the dashpot piston 71 may be modified in size. They may also be modified as shown in Fig. 4. In the case of Fig. 4, the stem 65 carries a dashpot piston 97 in which are ports 73 such as already described. Additional ports 99 are organized with oppositely opening spring-pressed one-way check valves 101 and 103. These provide means of control over the frequency at which damping action will start, and thus serve effectively to control the ride of a vehicle. When the fixed orifices 73 choke up at the higher frequencies or amplitudes, the check valves 101 and 103 act as relief valves to continue relatively free flow across piston 97. Thus the valve 44 at higher frequencies may more readily follow the movements of the main piston 7. This delays damping action until higher frequencies and amplitudes are reached. If desired, one or more check valves such as 101 or 103, throttling in one direction, may be used. Also, in the Fig. 4 form of the invention, the head 3 is provided with a threaded portion 105 into which is adjustably threaded the cylinder 107 within which the dashpot piston 97 operates, suitable packing 109 and a lock nut 111 being employed. This arrangement permits an adjustment wherein the dashpot piston 97 can be centered or otherwise arbitrarily easily positioned relative to the dashpot cylinder 107, that is, at any position of piston 7 in cylinder 1 corresponding to any desired static load.

If it is desired optionally to damp the vibration only in the upward direction of movement of cylinder 1 relative to piston 7, the plug 79 may be removed. Thus upon the stated upward movement of the cylinder 1 (relative downward movement of piston 7), valve 77 remains closed and the action is as already stated. Upon relative upward movement of the piston 7, the valve 77 opens, providing a relatively free flow of fluid from the top to the bottom of piston 7 and eliminating the effect of the valve 44. This of course corresponds to a relatively free downward movement of the cylinder 1 attached to the load-carrying member but a damping upon upward movement. This type of action is often desirable in vehicular practice, inasmuch as it reduces shock to the descending load (which is absorbed by the car springs) but at the same time prevents the building up of a large rebound. On the other hand, an advantage of omitting the valve 77, or its action, is that bottoming of large loads is prevented, i.e., reaching the limit of spring deflection by coil-to-coil contact.

Figure 5:
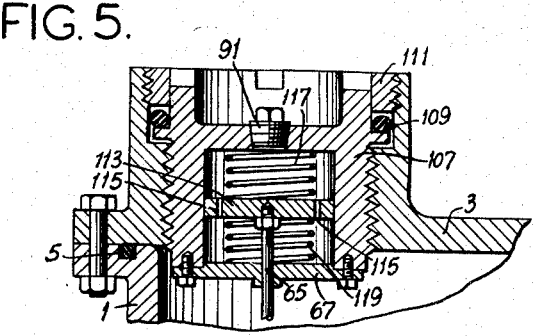

In Fig. 5, like numerals designate like parts. In this case the dashpot piston is indexed 113 and has throttling ports 115. On opposite sides of the piston 113 are located compression springs 117 and 119. The effect of these is to obtain more damping action with a load change. Thus with a load increase the piston 7 rises relatively in cylinder 1, which tends relatively to lift dashpot piston 113. The upper spring 117 then tends to bias piston 113 downward relative to piston 7, thus pushing valve 44 relatively downward. This increases the throttling action on hydraulic flow across piston 7 and increases the damping action for the increased load. The effect of the spring 119 is to cause increased damping or snubbing action with loads lighter than the selected load for centering piston 113. Thus the two springs 117 and 119 keep the dashpot piston 113 more or less centered in cylinder 107 for an arbitrary load and to increase the damping or snubbing action with increase or decrease in load.

It is apparent also that only one spring 117 or 119 may be used if inserted with no initial deflection at the position selected for piston 113, under conditions corresponding to the arbitrarily selected load. When no springs are used, as shown in Fig. 1, the device operates to damp or snub vibrations in the same way at any loading, whereas with the modification shown in Fig. 5, the snubbing action increases for change of loading from a predetermined amount.

As suggested by the drawings, piston 7 is to be made of substantial diameter, so that with nominal unit pressure built up on one side or the other, it will produce a substantial total reaction, whereby the vibrations of large loads may successfully be controlled. Piston 71 may be made relatively small, being required only to control the balanced valve 44. Since the spool-type valve 44 is of the balanced type, its progressive action depends substantially only upon lag induced in the dashpot and not substantially upon any liquid current or pressure within or around it. This reduces the number of factors requiring consideration when changes in design are required to meet specific conditions. Therefore, the invention lends itself to being readily varied in form to suit the requirements of particular applications.

It will be understood that while the main plunger is illustrated as the piston 7, it may be constituted by a flexible diaphragm across the cylinder 1, the center portion of which diaphragm is movable and having in it the porting arrangement such as already described in connection with valve 44; also that the auxiliary plunger piston 71 in the auxiliary cylinder or dashpot 69 may be constituted by a flexible diaphragm with suitable ports. Moreover, the valve 44 arrangement in piston 7 and connected dashpot arrangement in head 3 may be multiplied so as to provide stamping actions in tandem between the piston 7 and cylinder 1. Also, a loose fit between piston 71 and cylinder 69 may substitute for the ports 73. The attached claims are intended to cover such variations in carrying out the principles employed in the invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Vibration damping apparatus comprising a liquid-filled main cylinder, a main piston therein, means for attaching the cylinder and the piston to relatively movable and resiliently related parts, one of which carries a load, said main piston having means therein forming a connecting passage between its opposite sides and including spaced ports, movable valve means constituted by spaced heads, said heads having channels therein respectively connecting with said ports and shaped to provide progressive throttling action as a head moves in a direction to close a port, means adapted normally to position said valve means for maximum port openings in connection with said channels, and an auxiliary liquid-filled cylinder forming a dashpot, an auxiliary piston having at least one throttling port therethrough and located in said dashpot cylinder, and means connecting said auxiliary piston with said valve means for movement therewith.

2. Vibration damping apparatus comprising a liquid-filled main cylinder, a main piston therein, means for attaching the cylinder and the piston to relatively movable and resiliently related parts, one of which carries a load, said main piston having means therein forming a connecting passage between its opposite sides and including a cylinder having spaced ports, movable valve means constituted by a spool having heads spaced apart a distance approximating the distance between said ports, said heads being adapted to traverse said ports and having channels therein shaped to provide progressive throttling action as a head moves in the direction to close a port, spring means adapted normally to position said valve means for maximum port openings, and an auxiliary liquid-filled cylinder forming a dashpot, an auxiliary piston having at least one throttling port therethrough and located in said dashpot cylinder, and rigid means connecting said auxiliary piston with said valve means for equal movements therewith.

3. Vibration damping apparatus made according to claim 2, wherein said channels in the valve means are constituted by oppositely extending slots in the spool heads, said channels having progressively oppositely decreasing cross sections.

4. Vibration damping apparatus made according to claim 2, wherein said channels in the valve means are constituted by oppositely extending slots in the spool heads, said channels having progressively oppositely decreasing triangular cross sections.

5. Vibration damping apparatus made according to claim 2, wherein said channels in the valve means are constituted by sloping flats formed on said heads on their adjacent portions.

6. Vibration damping apparatus comprising a main fluid container member, a first movable divider member therein, means for attaching the main container and divider members respectively to relatively movable and vibratory parts, one of said members having a fluid passage connecting opposite sides of said divider member and the other member having an auxiliary fluid container carried thereby, a movable valve in and controlling said passage adapted to throttle flow through said passage in response to movement of the valve relative to said one member in which it is located, means adapted normally to position the valve in said passage for substantial fluid flow therethrough, and a second movable divider in the auxiliary container formed to permit restricted fluid flow from one side to the other thereof, said second divider being connected with said valve means for movement therewith, the second divider in the auxiliary container being adapted to induce immediate valve lagging and fluid throttling movement in said passage in response to relatively rapid vibrations of said members, and to induce less or no lagging movements in response to relatively slow vibrations or their absence respectively, whereby promptness of initiation of damping action increases with the rapidity of the vibrations imposed by said vibratory parts.

7. Vibration damping apparatus made according to claim 6, wherein the one of said members which has said fluid passage connecting opposite sides of the divider member has an additional fluid passage connecting said opposite sides, said additional fluid passage having a check valve therein.

8. Vibration damping apparatus made according to claim 6, wherein said second movable divider in the auxiliary container includes several throttling passages therethrough having check valves therein respectively.

9. Vibration damping apparatus made according to claim 6, wherein said second movable divider has at least two additional passages therethrough, each including a check valve therein, said check valves being operative in opposed fluid flow directions.

10. Vibration damping apparatus made according to claim 6, including resilient means adapted to press on one side of said second movable divider upon movement thereof in the direction of said one side.

11. Vibration damping apparatus made according to claim 6, having oppositely expansive spring means adapted to press respectively upon opposite sides of said second movable divider upon opposite movements thereof.

12. Vibration damping apparatus comprising a main fluid container, a first movable divider therein, means for attaching the main container and the divider respectively to relatively movable and vibratory parts, said first divider having means therein forming a connecting passage between its opposite sides, movable valve means in and controlling said passage adapted upon movement therein to throttle fluid flow through said passage in response to movement of the valve means relative to the divider, means adapted normally to position the valve means for relatively unthrottled fluid flow, an auxiliary fluid container separate from said first movable divider and attached to said main fluid container, and a second movable divider in said auxiliary container formed to permit restricted fluid flow from one of its sides to the other thereof, said second divider being connected with said valve means for movement therewith.

13. Vibration damping apparatus made according to claim 12, wherein said first movable divider has in addition to said connecting passage therein another fluid passage connecting its opposite sides, said additional fluid passage having a check valve therein.

14. Vibration damping apparatus made according to claim 13, wherein said additional fluid passage in the first movable divider includes a removable closure plug.

15. Vibration damping apparatus made according to claim 12, wherein said second movable divider in said auxiliary fluid container includes several throttling passages therethrough having check valves therein respectively.

16. Vibration damping apparatus made according to claim 15, wherein said check valves are operative in opposed fluid flow directions.

17. Vibration damping apparatus made according to claim 12, including resilient means adapted to press one side of said second movable divider upon movement thereof in the direction of said one side.

18. Vibration damping apparatus made according to claim 12, including oppositely expansive spring means adapted to press respectively on opposite sides of said second movable divider upon opposite movements thereof.

19. Vibration damping apparatus made according to claim 12, wherein the attachment of said auxiliary container with the main fluid container is adapted for adjustment between them.

20. Vibration damping apparatus made according to claim 17, wherein the attachment of said auxiliary container with the main fluid container is adapted for adjustment between them.

21. Vibration damping apparatus made according to claim 18, wherein the attachment of said auxiliary container with the main fluid container is adapted for adjustment between them.

References Cited in the file of this patent

UNITED STATES PATENTS

| | | |
|---|---|---|
| 1,618,516 | Cross | Feb. 22, 1927 |
| 2,095,112 | Wallace | Oct. 5, 1937 |
| 2,151,663 | Oyston | Mar. 21, 1939 |
| 2,161,811 | Grebe | June 13, 1939 |
| 2,352,351 | Thornhill | June 27, 1944 |
| 2,735,515 | Cloudsley | Feb. 21, 1956 |